J. E. ROBINSON.
VEHICLE TIRE PROTECTOR.
APPLICATION FILED DEC. 20, 1906.
900,785.
Patented Oct. 13, 1908.
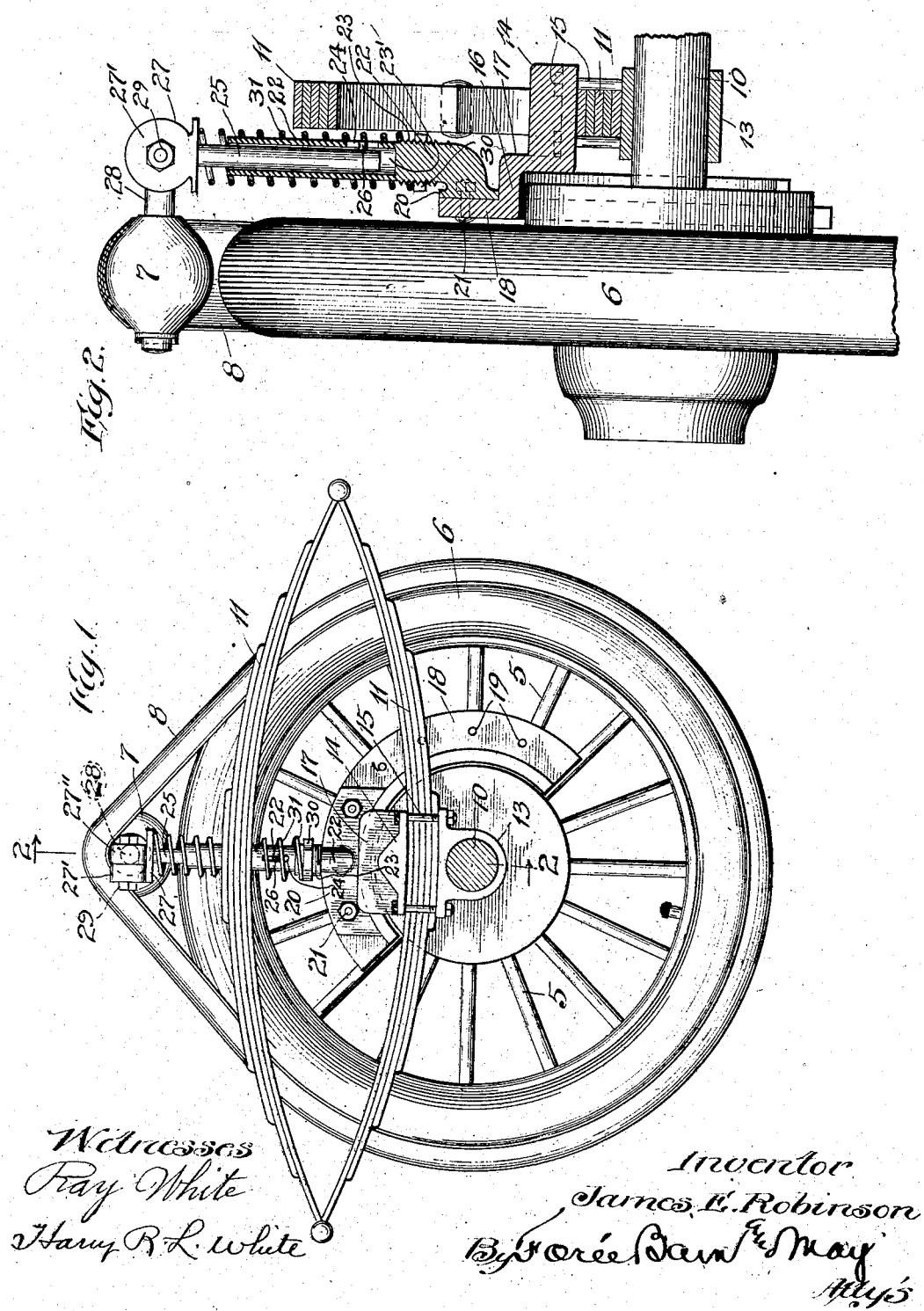
Witnesses
Ray White
Harry R. L. White
Inventor
James E. Robinson
By Orée Dawn & May
Attys

UNITED STATES PATENT OFFICE.

JAMES E. ROBINSON, OF CHICAGO, ILLINOIS.

VEHICLE-TIRE PROTECTOR.

No. 900,785.　　　　Specification of Letters Patent.　　　Patented Oct. 13, 1908.

Application filed December 20, 1906. Serial No. 348,684.

*To all whom it may concern:*

Be it known that I, JAMES E. ROBINSON, a citizen of the United States, residing at Chicago, in the county of Cook and State of Illinois, have invented certain new and useful Improvements in Vehicle-Tire Protectors, of which the following is a specification.

My invention relates to improvements in vehicle tire protectors, and has for its salient object to provide a tire protecting device for application to the tires of an automobile or other vehicle, which will operate to take up the wear which would otherwise cause deterioration of the tire and to prevent damage to the tire by puncture or otherwise.

A further object of my invention is to provide a tire protecting construction of the character described, which is simple, easy of manufacture, efficient in operation and readily applied to a vehicle.

Other and further objects of my invention will become apparent to those skilled in the art from the following description taken in conjunction with the accompanying drawing, wherein;

Figure 1 is a side view of an embodiment of my invention shown in association with a fragment of a running gear of an automobile; Fig. 2 is a section on line 2—2 of Fig. 1 with parts in elevation.

Throughout the drawing like numerals of reference refer always to like parts.

In the drawing 5 indicates a vehicle wheel, provided with a pneumatic tire 6.

7 indicates a pulley, mounted for rotation in the plane of but out of contact with the tire 6, on an axis parallel to the axis of rotation of the wheel, and with its peripheral surface arched in a direction parallel with its axis of rotation.

8 indicates an endless belt or band, constituting the tire protector proper, running around a large portion of the surface of the tire, and then over the pulley 7. In general it will thus be seen that the tire protector 8 having a large surface in frictional engagement with the surface of the tire, travels with the tire, running over the rotatable pulley 7.

The tire protector proper, or belt 8 may be of suitable construction, preferably of tough and impervious qualities, that which I have herein illustrated comprising superposed layers of fabric and rubber united in an integral body, and somewhat thicker at its center than at its edges, the transverse section of the belt being suitably concaved to make intimate contact with the tread surface of the tire.

It is desirable that the curvature or arch of the pulleys 7 be of shorter radius than the curvature of the surface of the tire, so that a little greater tension may be exerted upon the middle of the belt than upon its edges. I prefer that the pulley 7 be mounted to exert a constant tension upon the belt, and that it be adjustable in an arc relative to the periphery of the wheel, so that it may be positioned in or at any angle to the radial plane of contact between the belt and the wheel-supporting surface; and I further prefer that the support be derived from the axle on which the wheel rotates. To this end I have illustrated in the drawing a typical supporting and adjusting structure, applicable to certain vehicle construction, but which it will be understood may be varied to suit the particular requirements of the vehicle to which the device is attached.

In the drawing 10 indicates the wheel axle, and 11 an elliptical spring secured thereto by an axle-engaging clip 13, a retaining plate 14 and suitable bolts 15. To the plate 14 is secured or integrally attached an outwardly extending arm 17, terminating in an upturned arcuate plate or flange 18, concentric with the axis of rotation of the wheel. Through the flange 18 are made suitable apertures 19, at proper intervals. This base and flange construction may be made in one piece as by casting.

20 indicates a short arcuate plate or shoe, provided with suitable apertures spaced apart a distance equal to that between apertures 19 and adapted to be secured by bolts 21 in any position of adjustment upon the arcuate plate 19. To the shoe 20 is secured or integrally connected an arm or standard 22, exteriorly screw threaded as at 23 near its point of attachment to the plate 18, and at its lower end provided with a recess 23' extending to a considerable depth therein. A slot 24 is made longitudinally through the cylindrical wall of the recess part.

The pulley 7, and its support, are circumferentially adjustable around the axis of the vehicle wheel without necessarily changing the length of the radius between the axes of the two wheels. The support is composed of the following parts; 25 indicates a stem sliding freely in the recess 23', provided with a pin 26 taking into slot 24. At its upper end the stem carries a two-piece head, generally indicated by 27. This head is composed of two disk-like parts 27' and 27". Part 27' is fixed to the stem and part 27" carries the spindle 28 upon which the pulley 7 rotates, and a bolt 29 secures the disk-like parts 27' and 27" together. By means of this composite head part 27 the axis of the pulley 7 may always be adjusted to a true horizontal position. A nut 30 is adjustably threaded on the thread 23, and a spring 31 is interposed between said nut and the head 27 to tend to force the head and consequently the pulley 7 away from the axle 10 with a tension that may be varied by adjustment of the nut 30.

It will be seen that the endless belt may readily be placed upon the wheel 6 and pulley 7 and that the pulley 7 may be rotatably adjusted relative to the axle to such position as to make displacement of the protecting belt 8 by skidding of the wheel most difficult, and that when so positioned the pulley acts with a uniform tension upon the belt to maintain it taut.

Obviously the diverse construction of different makes of automobiles may necessitate changes in the specific construction of the attaching device for securing the arcuate plate 18 in position with respect to the axle, but changes may be readily effected.

I have found that there is a critical point lying above the axis of the wheel between a vertical line and a horizontal line taken through said axis where the pulley 7 should be located to exert the greatest resistance against accidental displacement of the protector belt 8. I have also found that this location differs somewhat according to the varying characteristics of the wheels or tires that differ in size and construction. It is, therefore, convenient to be able to adjust the location of the pulley 7 circumferentially.

While I have herein described in some detail a specific embodiment of my invention, it will be understood that I do not limit my invention in its broader aspect to the specific construction shown and described, as considerable variations therefrom may be made without departure from the spirit and scope of my invention.

Having thus described my invention, what I claim and desire to secure by Letters Patent of the United States, is:

1. In combination, a vehicle wheel provided with a pneumatic tire, an axle therefor, a pulley in the plane of but separated from said vehicle wheel, a support for said pulley, associated with the axle for movement therewith and a tire protecting belt running over said tire and said pulley.

2. In combination, a wheel provided with a pneumatic tire, an axle therefor, an arm extending outward from the axle and supported for movement therewith, a rotatable pulley mounted on said arm, arranged in the plane of the vehicle wheel, and a tire protecting belt running over said tire and said pulley.

3. In combination with a vehicle wheel provided with a pneumatic tire, a pulley arranged in the plane of but out of contact with said vehicle wheel, a support for the pulley secured to the axis of said wheel, a belt passing over said pulley and under the tread of the vehicle wheel, and an elastic means for automatically exerting a pressure on said pulley to maintain the belt under uniform tension.

4. In combination with a vehicle tire, a structure to which said vehicle wheel is attached, a pulley supported from said structure and arranged in the plane of but out of contact with said vehicle wheel, a belt passing around said vehicle wheel and the pulley, and a means for adjusting said pulley circumferentially relative to the axis of rotation of the wheel.

5. In combination with a wheel and axle of a vehicle, a pulley, arranged in the plane of but out of contact with said wheel, a belt passing around said pulley and wheel, and a spring pressed support for the pulley connected with and supported from the axle.

6. In combination with a wheel and the non-rotating parts connected therewith, a radial post connected with said part, and provided with a recess, a stem in said recess, a spring tending to press said stem outward in the recess, a pulley receiving support from said stem, and a belt encircling the wheel and pulley.

In testimony whereof I hereunto set my hand in the presence of two witnesses.

JAMES E. ROBINSON.

In the presence of—
 GEO. T. MAY, Jr.,
 MARY F. ALLEN.